No. 708,297. Patented Sept. 2, 1902.
V. BAUGHMAN.
COMBINATION SHEEP FEEDING RACK AND SHEARING TABLE.
(Application filed Mar. 30, 1899.)
(No Model.) 2 Sheets—Sheet 1.
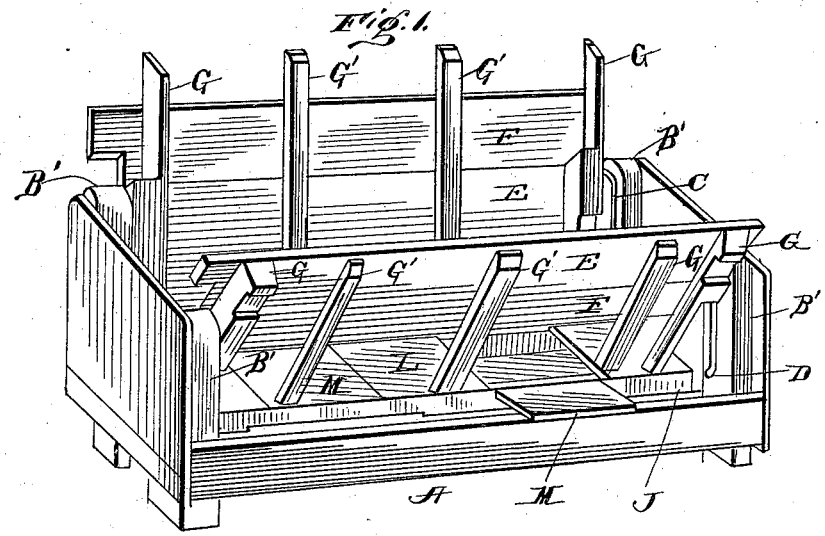
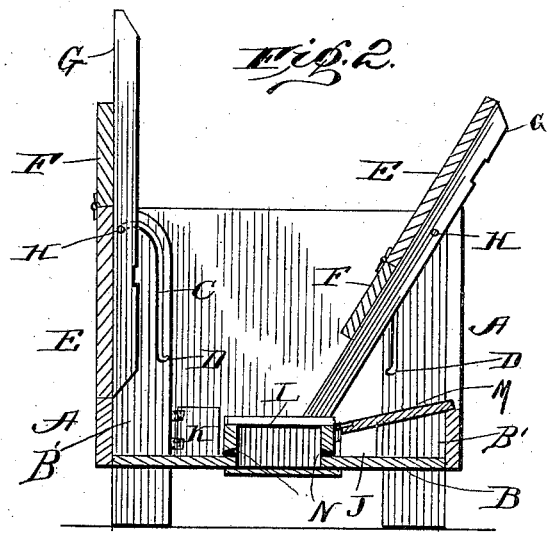
Witnesses
J. M. Fowler Jr.
Thomas Durant.
Inventor
Ves Baughman
By O'Farrell, Fowler & O'Farrell
Attorneys No. 708,297. Patented Sept. 2, 1902.
V. BAUGHMAN.
COMBINATION SHEEP FEEDING RACK AND SHEARING TABLE.
(Application filed Mar. 30, 1899.)
(No Model.) 2 Sheets—Sheet 2.
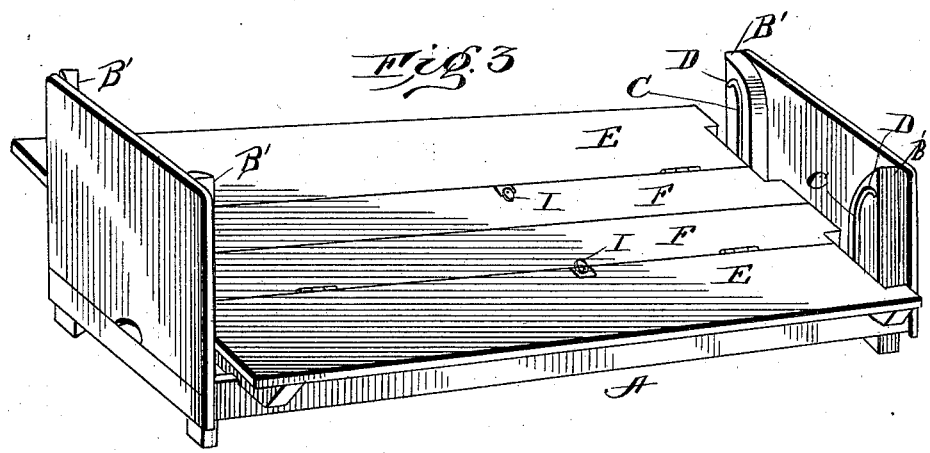
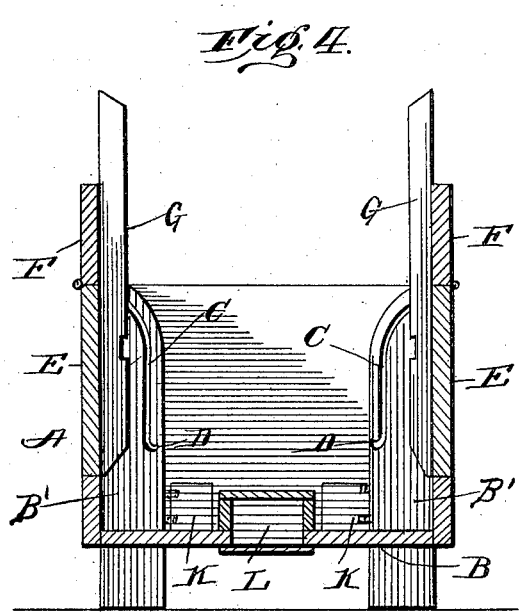
Witnesses: Inventor
J. M. Fowler Jr. Ves. Baughman
Thomas Durant By O'Farrell, Fowler & O'Farrell
Attorneys

UNITED STATES PATENT OFFICE.

VES BAUGHMAN, OF MARYSVILLE, OHIO.

COMBINATION SHEEP FEEDING RACK AND SHEARING TABLE.

SPECIFICATION forming part of Letters Patent No. 708,297, dated September 2, 1902.

Application filed March 30, 1899. Serial No. 711,088. (No model.)

*To all whom it may concern:*

Be it known that I, VES BAUGHMAN, a citizen of the United States of America, residing at Marysville, in the county of Union and State of Ohio, have invented certain new and useful Improvements in Combination Sheep Feeding Racks and Shearing Tables, of which the following is a specification.

My invention relates to a combined sheep feeding rack and shearing table, and has for its object to so construct such a device as to enable sheep to be fed with either grain, bran, ensilage, hay, or fodder without wasting or soiling the same and to provide means for excluding the sheep from the rack while the feed is being placed therein. For the attainment of these several objects my invention consists, in brief, in certain details of construction, arrangement, and combination of parts, which will be more fully described hereinafter, and the specific points of novelty which will be designated in the appended claim.

In the drawings forming part of this specification, Figure 1 is a perspective view of a combined sheep feeding rack and shearing table embodying my invention, one of the leaves being closed and one open and one grain-lid being open, the other closed. Fig. 2 is a cross-sectional view of the same. Fig. 3 is a perspective view illustrating the invention adjusted to form a shearing-table. Fig. 4 is a sectional view showing the leaves in the raised position.

Referring by letters to the drawings, A represents a rectangular frame having a platform or bed B, which is at a suitable height from the ground. The vertical uprights B' at the ends of the frame are provided with curved slots C, having notches D at each end thereof. The leaves E are provided with dependent leaves F, hinged thereto in any desirable manner, are also provided with bars G and G', the bars G being pivotally and adjustably mounted in the slots C on bearings H. These leaves may be so adjusted as to form a shearing-table, as shown in Fig. 3, and also to form a feeding-rack, as illustrated in Figs. 1 and 2, and when so used it may be further adjusted so as to adapt its use for either short or long feed. When used for short feed, the dependent leaves F are folded down upon the bars G' and secured in position by a suitable catch I, and when adjusted for long feed the dependent leaves are folded back upon the leaves E.

When it is desired to feed bran, grain, &c., the leaves are folded down against the sides of the frame, so as to exclude the sheep from the rack, thus permitting the troughs J, which are formed by the respective sides and ends of the frame, and a central grain-receptacle hereinafter referred to, in connection with the platform which forms the bottom thereof, to be cleansed through the doors K and the grain-receptacle L to be filled without the annoyance of the sheep crowding and jostling each other in struggling for food.

The grain-receptacle L consists of a longitudinal casing in the center of the frame. It is of a suitable size and is provided with a hinged lid M in order that the grain may be readily placed therein. It is also provided with longitudinal slots N, which are oppositely disposed with respect to each other, extending along the base of the casing and flush with the troughs, thus admitting only a small amount of feed at one time to the troughs which are upon the respective sides of the grain-receptacle, which prevents a waste and the soiling of the bulk by the sheep messing over the same, as is the case with the racks now in use.

It will thus be seen that I provide an exceedingly cheap and simple form of a combination sheep feeding rack and shearing table and one that will efficiently perform all of its intended functions.

Having thus described the various features of my invention, what I claim as new, and desire to secure by Letters Patent, is—

In a sheep-feeding rack, a frame supporting a bed, a central longitudinal grain-receptacle mounted upon the said bed having oppositely-disposed longitudinal feeding-slots through the sides thereof, a trough upon each side of the grain-receptacle into which the feeding-slots open, leaves having series of bars arranged thereupon curved slots in each end of the frame, the bars upon the respective ends of the leaves being pivotally and adjustably secured in the said slots, dependent leaves hinged to the leaves supported by the bars, and adapted to be folded down upon the bars or back upon the leaves supported thereby, substantially as shown and for the purpose set forth.

VES BAUGHMAN.

Witnesses:
R. L. WOODBURN,
MARY EDNA REYNER.